United States Patent [19]
Tabata et al.

[11] Patent Number: 5,444,103
[45] Date of Patent: Aug. 22, 1995

[54] MODIFIED POLYTETRAFLUOROETHYLENE AND PROCESS FOR ITS PRODUCTION BY IRRADIATION

[75] Inventors: Yoneho Tabata; Kazushige Otsuhata, both of Tokyo; Tetsuya Ikeda, Fukuoka; Kohji Ueno, Ehime; Yuichi Yoshida, Saitama; Akihiro Oshima, Tochigi; Tadao Suguchi; Hisaaki Kudoh, both of Gunma, all of Japan

[73] Assignee: Raytech Corporation, Tokyo, Japan

[21] Appl. No.: 130,847

[22] Filed: Oct. 4, 1993

[30] Foreign Application Priority Data

Oct. 5, 1992 [JP] Japan .................. 4-266257

[51] Int. Cl.$^6$ ............ C08F 2/46; C08F 2/54; C08F 2/48; C08J 3/28
[52] U.S. Cl. ............................. 522/5; 522/156
[58] Field of Search ............. 522/5, 156, 912, 911, 522/155

[56] References Cited

U.S. PATENT DOCUMENTS 4,586,995  5/1986  Randall et al. .................. 522/5

FOREIGN PATENT DOCUMENTS 0666466  7/1963  Canada .................. 522/156

OTHER PUBLICATIONS

Zhong et al., 1990, "Studies on Radiation Effects of PTFE. II. Radiation-Induced Structural Changes and the Temperature Effect," *J. Macromol. Sci.-Phys.*, B29(4):369–377.

Zhong et al., 1992, "XPS Study of Radiation Cross-linked Copolymer of Tetrafluoroethylene with Hexafluoropropylene," *Journal of Applied Polymer Science*, 44:639–642.

Zhong et al., 1993, "The radiation stability of perfluoroalkoxy resin," *Polymer Degradation and Stability*, 40:115–116.

Zhong et al., 1993, "Radiation stability of PTFE irradiated under various conditions," *Polymer Degradation and Stability*, 39:187–191.

Rye, 1993, "Spectroscopic Evidence for Radiation-Induced Crosslinking of Poly(tetrafluoroethylene)," *Journal of Polymer Science: Part B: Polymer Physics*, 31:357–364.

Zhong et al., 1993, "Radiation-induced crystal defects in PTFE," *Polymer Degradation and Stability*, 40:97–100.

*Primary Examiner*—Susan W. Berman
*Attorney, Agent, or Firm*—Banner & Allegretti

[57] ABSTRACT

Modified PTFE is produced by exposing a starting PTFE to an ionizing radiation for a total dose of at least 100 kGy in the absence of oxygen at a temperature not lower than the crystal melting point of the starting PTFE. The thus modified PTFE is improved in radiation resistance and has rubber characteristics.

7 Claims, 3 Drawing Sheets

MODIFIED POLYTETRAFLUOROETHYLENE AND PROCESS FOR ITS PRODUCTION BY IRRADIATION

BACKGROUND OF THE INVENTION

1. Field of the Invention

This invention relates to a modified polytetrafluoroethylene (hereunder abbreviated as PTFE) that is improved in radiation resistance (as evidenced by reduction in the radiation-induced deterioration of breaking extension and breaking strength) and which has rubber characteristics. The invention also relates to a process for producing such modified PTFE by applying an ionizing radiation to a starting PTFE.

2. Description of the Prior Art

PTFE is a plastic material having improved resistance to chemicals and heat and it has heretofore been used extensively as both industrial and consumer resins. Further, PTFE is a crystalline polymer; although PTFE is a resin that has a comparatively high hardness and low rubber characteristics, it will easily undergo plastic deformation at low temperatures such as room temperature. However, PTFE is very sensitive to radiations and its mechanical characteristics will deteriorate if the absorbed dose exceeds 1 kGy; hence, PTFE has been unsuitable for use in nuclear facilities and other environments of exposure to radiations. This is because molecular cleavage occurs preferentially in PTFE upon exposure to radiation, which contributes to accelerated progress of crystallization.

Currently available PTFEs are typical radiation-degradable plastics and to make them suitable for use not only in nuclear facilities and other environments of exposure to radiations but also in sealing and packing materials, it has been desired to impart radiation resistance (i.e., reduction in the radiation-induced deterioration of breaking extension and breaking strength), as well as low crystallinity and rubber characteristics.

SUMMARY OF THE INVENTION

An object, therefore, of the present invention is to provide a modified PTFE having not only radiation resistance but also low crystallinity and rubber elasticity.

Another object of the present invention is to provide a process for producing such improved PTFE by applying an ionizing radiation to a starting PTFE under specified conditions.

Other objects and advantages of the present invention may become apparent to those skilled in the art from the following description and drawings.

DETAILED DESCRIPTION OF THE INVENTION

To produce the modified PTFE of the present invention, a starting PTFE is given a preliminary exposure to an ionizing radiation at a temperature not lower than the crystal melting point of PTFE (327° C.). To prevent oxidation during exposure, the PTFE is placed in an oxygen-free atmosphere, namely, in vacuo or in an inert gas atmosphere. Examples of the ionizing radiation are $\gamma$-rays, electron beams, X-rays, neutron beams and high-energy ions, which are hereunder referred to collectively as "radiations". The temperature for exposure to radiations is desirably about 340° C. The absorbed dose of radiations is in a range of from 1 kGy to 10 MGy; from the viewpoint of rubber characteristics, the range from 200 kGy to 5 MGy is particularly preferred. It is contemplated that the starting PTFE will be crosslinked if it is given a preliminary exposure to radiations under the conditions specified above.

The PTFE modified in accordance with the present invention is useful not only as an industrial material in radioactive environments where the use of PTFEs has heretofore been impossible but also as the constituent material of medical tools that permit radiation sterilization. Currently used PTFE medical tools which defy radiation sterilization are sterilized by water steam or other gases but the modified PTFE of the present invention enables radiation sterilization which is more reliable than sterilization by other methods. As a further advantage, the modified PTFE has rubber characteristics and this will contribute to marked improvements in the performance of sealing and packing materials as machine parts that need particularly high resistance to heat and chemicals.

The following examples are provided for the purpose of further illustrating the present invention but are in no way to be taken as limiting.

EXAMPLE 1

Figure 1:
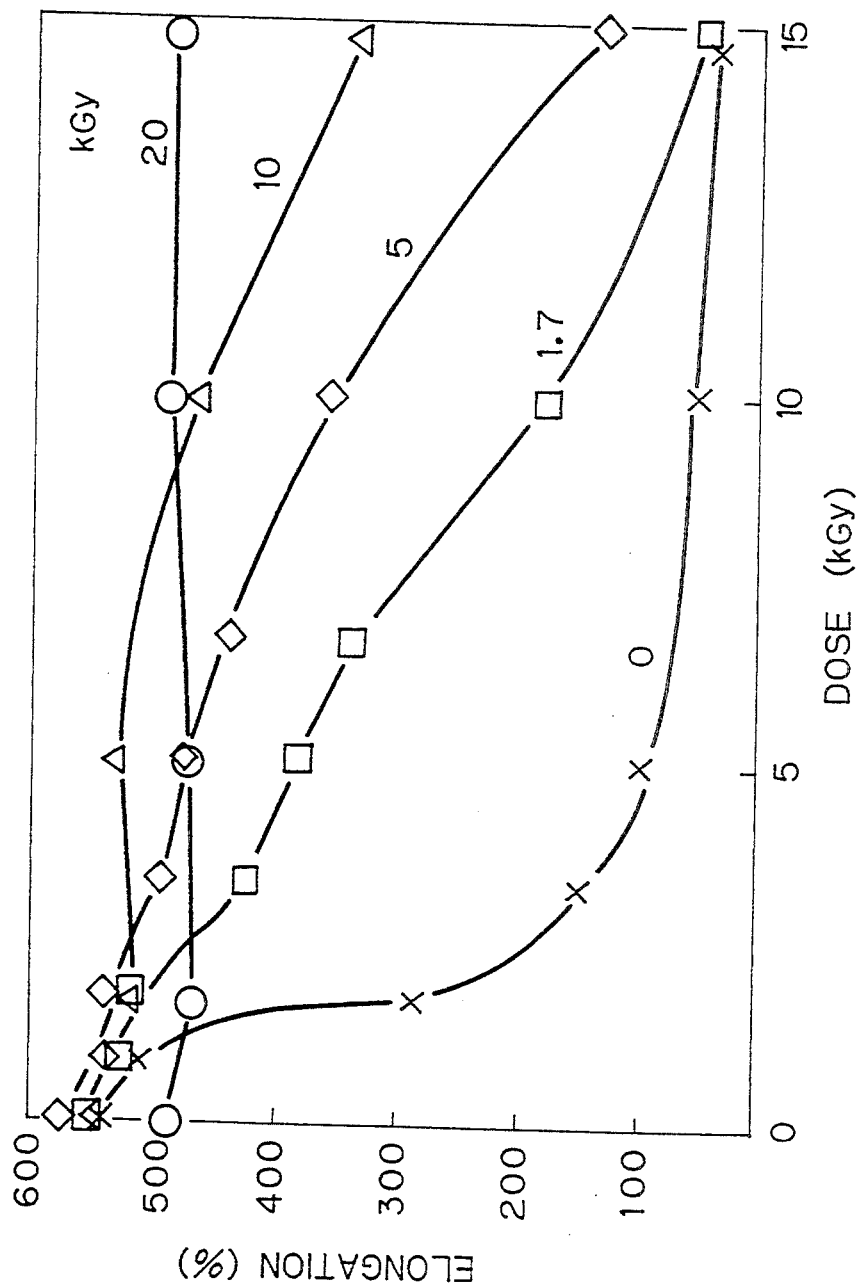
FIG. 1 is a graph showing the relationship between the elongation of a radiation-modified PTFE and the absorbed dose of radiation as applied subsequently in Example 1 at room temperature in air, with an unitradiated PTFE being a control.
Figure 2:
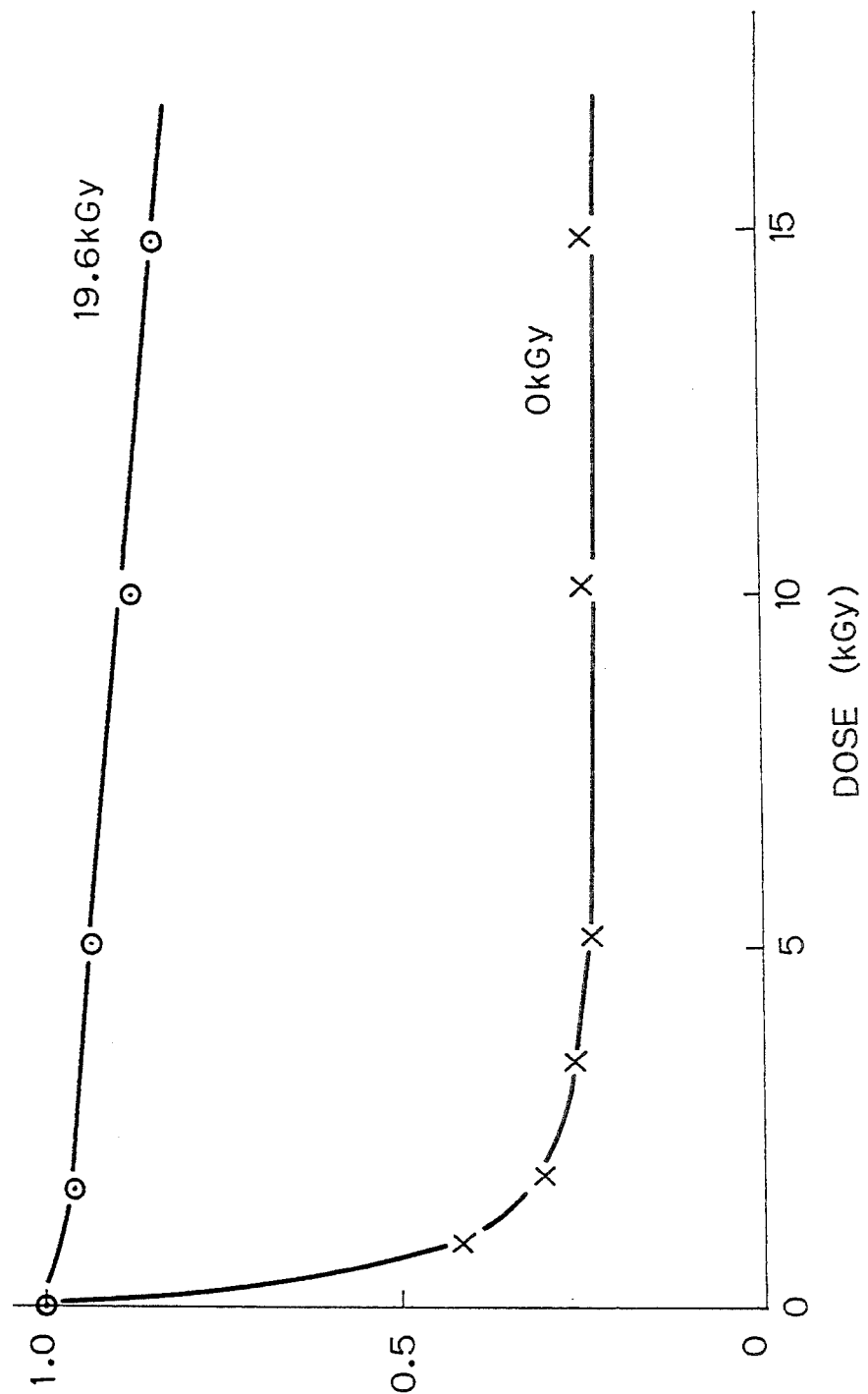
FIG. 2 is a graph showing the relationship between the breaking strength (in relative values) of a radiation-modified PTFE (19.6 kGy×340° C.) and the absorbed dose of radiation as applied subsequently in Example 1 at room temperature in air, with an unitradiated PTFE being a control.

Commercial PTFE sheets 1 mm thick were placed in vacuo ($\leq 0.01$ Tort) and exposed to $\gamma$-rays from cobalt-60 for total doses of 1.7 kGy to 20 kGy at an elevated temperature of about 340° C.; subsequently, the sheets were exposed to $\gamma$-rays for total doses of 0–15 kGy at room temperature in air. After the irradiation, the elongation and the breaking strength of the sheets were measured. The relationship between the absorbed dose of $\gamma$-rays as applied to the sheets in air at room temperature, following the preliminary expose for total doses of 0, 1.7, 5, 10 and 20 kGy in vacuo at 340° C., and the breaking extension of the so treated sheets is shown in FIG. 1. As the curve connecting the crosses (X) in FIG. 1 shows, the PTFE sheet that was given no exposure to $\gamma$-rays at 340° C. (the prior art PTFE sheet) decreased by half in elongation upon subsequent exposure for a total dose of 2 kGy. In contrast, the PTFE sheets that were given preliminary exposure to $\gamma$-rays at 340° C. experienced less decrease in elongation. Similar results were observed in the relationship between breaking strength (in relative values) and absorbed dose, which is shown in FIG. 2. The PTFE sheet that had been given exposure to $\gamma$-rays for a total dose of 19.6 kGy at 340° C. experienced only small drops in breaking strength even when it was subsequently irradiated for a total dose of 15 kGy. Hence, it was clear that radiation resistance was imparted by preliminary exposure to radiation under the specified conditions.

EXAMPLE 2

PTFE sheets 0.3 mm thick were placed in vacuo ($\leq 0.01$ Torr) and exposed to electron beams (2 MeV) at about 340° C. for total doses ranging from 100 kGy to 2 MGy. After the irradiation, the sheets were subjected to a tensile test to examine the changes in their elongation and strength. Data on the breaking extension and yield strength of the sheets are shown in Table 1 and FIG. 3, from which one can see that compared to irradiation in vacuo at room temperature, the method of irradiation in accordance with the present invention was effective in suppression the material deterioration by significant degrees.

TABLE 1

| Absorbed dose, kGy | | 0 | 100 | 200 | 1500 | 1000 | 2000 |
|---|---|---|---|---|---|---|---|
| Irradiation in vacuo at 340° C. | Breaking extension, % | 390 | 460 | 390 | 330 | 240 | 160 |
| | Yield strength, MPa | 10 | 13 | 16 | 19 | 22 | 26 |
| Irradiation in vacuo at R.T. | Breaking extension, % | 390 | 110 | 50 | 2 | | |
| | Yield strength, MPa | 10 | 11 | 11 | 8 | | |

EXAMPLE 3

PTFE sheets 0.5 mm thick were placed in vacuo and exposed to electron beams (2 MeV) at about 340° C. for total doses ranging from 100 kGy to 3 MGy. The resulting change in the crystallinity of PTFE was monitored by differential scanning calorimetry (DSC). The results are shown in Table 2, from which one can see the following: the crystallization temperature decreased with the increasing dose; the amount of heat of crystallization also decreased with the increasing dose; beyond 2 MGy, no more crystals formed. As the amount of heat of crystallization decreased, the turbidity of PTFE decreased at room temperature and it became more or less transparent. The sheet that was given exposure for a total dose of 3 MGy until crystals disappeared became transparent.

TABLE 2

| Absorbed dose, kGy | | 0 | 100 | 200 | 500 | 1000 | 2000 | 3000 |
|---|---|---|---|---|---|---|---|---|
| Irradiation in vacuo at 340°C. | Crystal melting point, °C. | 327 | 317 | 309 | 290 | 258 | 226 | — |
| | Crystallization temperature, °C. | 306 | 297 | 283 | 262 | 233 | 201 | |
| | Amount of heat of crystallization, J/g | 18 | 33 | 32 | 25 | 14 | 3 | 0 |
| Irradiation in vacuo at R.T. | Crystal melting point, °C. | 327 | 327 | 327 | 322 | | | |
| | Crystallization temperature, °C. | 306 | 306 | 304 | 292 | | | |
| | Amount of heat of crystallization, J/g | 18 | 43 | 42 | 42 | | | |

Figure 3:
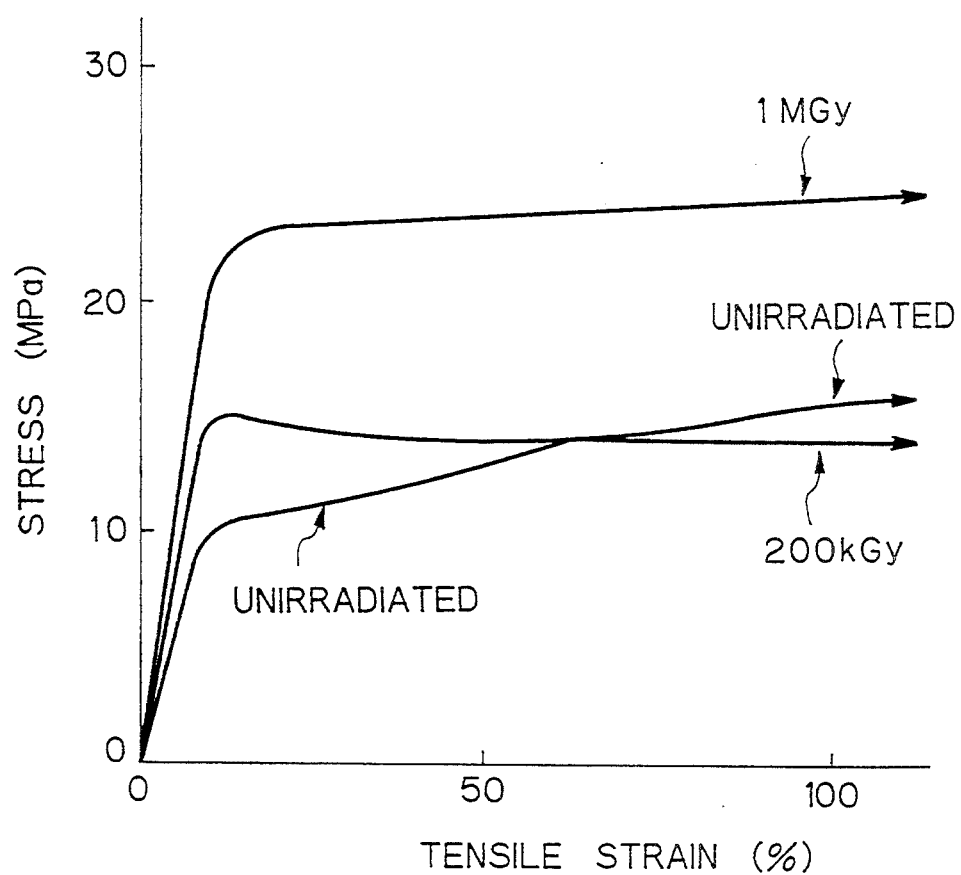
FIG. 3 is a graph showing the relationship between the stress and tensile strain as developing in a tensile test on a radiation-modified PTFE in Example 3.

The samples prepared in Example 3 were subjected to a tensile test to measure the relationship between the stress applied to the samples and the tensile strain that developed in them. The result is shown in FIG. 3, from which one can verify that the samples had rubber elasticity.

EXAMPLE 4

PTFE sheets 1 mm thick were heated at about 340° C. in a helium stream and exposed to electron beams as in Example 3. The result was the same as in Examples 2 and 3.

EXAMPLE 5

PTFE sheets having thickness of 0.3, 0.5 and 1 mm were exposed to electron beams in vacuo at about 370° C. As the exposure time increased, the sheets became thinner, probably because the PTFE started to decompose by heat.

As is clear from the foregoing description, the modified PTFE produced by the process of the present invention is reduced in the radiation-induced deterioration of breaking extension and breaking strength. Further the PTFE has low crystallinity, exhibits rubber elasticity and features improved yield strength; because of these advantages, the modified PTFE prove very useful as an industrial material.

What is claimed is:

1. A process for producing a modified polytetrafluoroethylene that is reduced in the radiation-induced deterioration of breaking extension and breaking strength, is low in crystallinity, and which has rubber characteristics, comprising:
   exposing a starting polytetrafluoroethylene to an ionizing radiation for a total dose of from 100 kGy to 5 MGy in the absence of oxygen at a temperature of from 330° C. to 350° C.

2. A process according to claim 1 wherein the starting polytetrafluoroethylene to prevent oxidation during exposure is placed in vacuo or in an inert gas atmosphere.

3. A process according to claim 1 wherein the total dose is in a range of 200 kGy to 5 MGy.

4. A process according to claim 1 wherein the temperature for exposure to radiations is about 340° C.

5. A process according to claim 1 wherein the ionizing radiation is one selected from the group consisting of γ-rays, electron beams, X-rays, neutron beams and high-energy ions.

6. A process for producing a modified polytetrafluoroethylene that is reduced in the radiation-induced deterioration of breaking extension and breaking strength, is low in crystallinity, and which has rubber characteristics, comprising:
   exposing a starting polytetrafluoroethylene to an ionizing radiation selected from the group consisting of γ-rays and electron beams for a total dose of from 200 kGy to 5 MGy in vacuo or in an inert gas atmosphere at about 340° C.

7. A modified polytetrafluoroethylene that is reduced in the radiation-induced deterioration of breaking extension and breaking strength, is low in crystallinity, and which has rubber characteristics prepared by the process of claim 1.

* * * * *

UNITED STATES PATENT AND TRADEMARK OFFICE
CERTIFICATE OF CORRECTION

PATENT NO. : 5,444,103
DATED : August 22, 1995
INVENTOR(S) : Yoneho TABATA, et al.

It is certified that error appears in the above-indentified patent and that said Letters Patent is hereby corrected as shown below:

Please correct the spelling of one of the inventors' names as follows:

"Tadao Suguchi" should be changed to "Tadao Seguchi".

To the designated Assignee, RAYTECH CORPORATION (Tokyo, Japan), please add the second designated Assignee:

--JAPAN ATOMIC ENERGY RESEARCH INSTITUTE (Tokyo, Japan)--.

Signed and Sealed this

Thirtieth Day of September, 1997

*Attest:*

BRUCE LEHMAN

*Attesting Officer*     *Commissioner of Patents and Trademarks*